US012781823B2

(12) United States Patent
Yamada et al.

(10) Patent No.: US 12,781,823 B2
(45) Date of Patent: Nov. 3, 2026

(54) DISC SPRING MANUFACTURING METHOD, AND DISC SPRING

(71) Applicant: NHK SPRING Co., Ltd., Yokohama (JP)

(72) Inventors: Yoshio Yamada, Yokohama (JP); Hideaki Sakai, Yokohama (JP); Shuji Takahashi, Yokohama (JP)

(73) Assignee: NHK SPRING CO., LTD., Yokohama (JP)

( * ) Notice: Subject to any disclaimer, the term of this patent is extended or adjusted under 35 U.S.C. 154(b) by 735 days.

(21) Appl. No.: 18/031,442

(22) PCT Filed: Oct. 13, 2021

(86) PCT No.: PCT/JP2021/037943
§ 371 (c)(1),
(2) Date: Aug. 22, 2023

(87) PCT Pub. No.: WO2022/080427
PCT Pub. Date: Apr. 21, 2022

(65) Prior Publication Data

US 2025/0264142 A1 Aug. 21, 2025

(30) Foreign Application Priority Data

Oct. 14, 2020 (JP) ................................ 2020-173168

(51) Int. Cl.
*F16F 1/32* (2006.01)
*C21D 7/06* (2006.01)

(52) U.S. Cl.
CPC .................. *F16F 1/32* (2013.01); *C21D 7/06* (2013.01); *F16F 2224/0208* (2013.01); *F16F 2226/04* (2013.01)

(58) Field of Classification Search
CPC ........ F16F 1/02; F16F 1/32; F16F 2224/0208; F16F 2226/04; C21D 7/06
(Continued)

(56) References Cited

U.S. PATENT DOCUMENTS 4,135,283 A * 1/1979 Kohlhage .............. F16F 1/324 29/896.9
5,971,377 A 10/1999 Knorr
(Continued)

FOREIGN PATENT DOCUMENTS

CN 104321554 A 1/2015
GB 1528598 A 10/1978
(Continued)

OTHER PUBLICATIONS

JP-2000027915 (Year: 2000).*
(Continued)

*Primary Examiner* — Thomas J Williams
(74) *Attorney, Agent, or Firm* — CANTOR COLBURN LLP

(57) ABSTRACT

A disc spring manufacturing method is a method for manufacturing a disc spring including a spring body formed into an annular shape and having an outer circumferential surface, an inner circumferential surface, an outer circumferential edge, and an inner circumferential edge, and includes applying a compressive residual stress to at least an outer end portion in the radial direction on the inner circumferential surface by relatively rotating a support body supporting at least the outer end portion in the radial direction on the inner circumferential surface and the spring body around a center axis line of the spring body while the support body and the spring body are brought into sliding contact with
(Continued)

each other in a state in which a compressive force in an axial direction along the center axis line is applied to the spring body using the support body.

9 Claims, 7 Drawing Sheets

(58) Field of Classification Search
USPC .......................................... 267/159, 160, 161
See application file for complete search history.

(56) References Cited

U.S. PATENT DOCUMENTS

| | | | | |
|---|---|---|---|---|
| 6,790,294 | B1 * | 9/2004 | Ishida | C21D 7/06<br>148/228 |
| 2004/0016278 | A1 | 1/2004 | Douman et al. | |
| 2005/0029721 | A1 | 2/2005 | Muhr et al. | |
| 2005/0155203 | A1 * | 7/2005 | Prevey | B23P 9/02<br>29/90.01 |
| 2008/0006351 | A1 * | 1/2008 | Hesselmann | B23P 9/02<br>148/559 |
| 2016/0208875 | A1 | 7/2016 | Yoshikawa | |
| 2020/0292022 | A1 * | 9/2020 | Buchhagen | C22C 38/44 |
| 2021/0115993 | A1 * | 4/2021 | Terada | F16F 1/32 |

FOREIGN PATENT DOCUMENTS

| | | | | | |
|---|---|---|---|---|---|
| JP | 5166960 | A | | 4/1992 | |
| JP | 2000027915 | A | * | 1/2000 | |
| JP | 2004050362 | A | | 2/2004 | |
| JP | 2004144132 | A | | 5/2004 | |
| JP | 2005054995 | A | | 3/2005 | |
| JP | 2006258239 | A | | 9/2006 | |
| JP | 2008291853 | A | | 12/2008 | |
| JP | 5209904 | B2 | | 6/2013 | |
| JP | 6654261 | B1 | | 2/2020 | |
| JP | 2020125790 | A | | 8/2020 | |
| WO | WO-2013011737 | A1 | * | 1/2013 | B24C 1/10 |
| WO | 2019189644 | A1 | | 10/2019 | |

OTHER PUBLICATIONS

International Search Report corresponding to International Application No. PCT/JP2021/037943; Mailing Date, Dec. 28, 2021.
SIPO First Office Action for corresponding CN Application No. 202180069595.4; Issued Dec. 17, 2025.

* cited by examiner

DISC SPRING MANUFACTURING METHOD, AND DISC SPRING

CROSS REFERENCE TO RELATED APPLICATIONS

This is the U.S. national stage of application No. PCT/JP2021/037943, filed on Oct. 13, 2021. Priority under 35 U.S.C. § 119 (a) and 35 U.S.C. § 365 (b) is claimed from Japanese Application No. 2020-173168, filed Oct. 14, 2020, the disclosure of which is also incorporated herein by reference.

TECHNICAL FIELD

The present invention relates to a disc spring manufacturing method and a disc spring.

BACKGROUND ART

In the related art, for example, a method described in the following Patent Document 1 is known as a method for manufacturing a disc spring including a spring body formed into an annular shape and having an outer circumferential surface facing an outward side in a radial direction, an inner circumferential surface facing an inward side in the radial direction, an outer circumferential edge that is an end surface on the outward side in the radial direction, and an inner circumferential edge that is an end surface on the inward side in the radial direction. In the method described in Patent Document 1, a compressive residual stress is applied to the spring body by rotating and moving a rotatably supported ball in a state in which the ball is pressed against the inner circumferential surface of the spring body.

CITATION LIST

Patent Document

[Patent Document 1] Japanese Patent No. 5209904

SUMMARY OF INVENTION

Technical Problem

In a disc spring manufacturing method in the related art, a compressive residual stress applied to a spring body is maximized at a depth position between an inner circumferential surface and an outer circumferential surface of the spring body, not on the inner circumferential surface where the highest tensile stress is generated when in use, and thus there is a probability that it may be difficult to improve the durability of a disc spring.

The present invention has been made in consideration of such circumstances, and an object thereof is to provide a disc spring manufacturing method capable of obtaining a disc spring in which a compressive residual stress is applied to an outer end portion of a spring body in a radial direction such that the compressive residual stress is maximized on an inner circumferential surface and decreases toward an outer circumferential surface throughout the entire length in a circumferential direction, and a disc spring.

Solution to Problem

A disc spring manufacturing method according to an aspect of the present invention is a method for manufacturing a disc spring including a spring body formed into an annular shape and having an outer circumferential surface facing an outward side in a radial direction, an inner circumferential surface facing an inward side in the radial direction, an outer circumferential edge that is an end surface on the outward side in the radial direction, and an inner circumferential edge that is an end surface on the inward side in the radial direction, and includes applying a compressive residual stress to at least an outer end portion in the radial direction on the inner circumferential surface by relatively rotating a support body supporting at least the outer end portion in the radial direction on the inner circumferential surface and the spring body around a center axis line of the spring body while the support body and the spring body are brought into sliding contact with each other in a state in which a compressive force in an axial direction along the center axis line is applied to the spring body using the support body.

According to the aspect, a compressive residual stress is applied to at least the outer end portion in the radial direction on the inner circumferential surface of the spring body by relatively rotating the support body supporting at least the outer end portion in the radial direction on the inner circumferential surface of the spring body and the spring body around the center axis line while being brought into sliding contact with each other in a state in which a compressive force in the axial direction is applied to the spring body using the support body.

Therefore, it is possible to reliably obtain a disc spring in which a compressive residual stress is applied to the outer end portion of the spring body in the radial direction such that the compressive residual stress is maximized on the inner circumferential surface where the highest tensile stress is generated at the time of using the disc spring and decreases toward the outer circumferential surface throughout the entire length in the circumferential direction around the center axis line.

When a compressive force in the axial direction is applied to the spring body using the support body, the spring body may be elastically deformed in the axial direction.

In this case, when a compressive force in the axial direction is applied to the spring body using the support body, the spring body is elastically deformed in the axial direction, and at least the outer end portion in the radial direction on the inner circumferential surface of the spring body is pulled. Accordingly, a high compressive residual stress can be reliably applied to the outer end portion in the radial direction on the inner circumferential surface of the spring body.

The support body may include a plurality of pressing projections arranged in a circumferential direction with an interval therebetween, and at least the outer end portion in the radial direction on the inner circumferential surface may be supported by the plurality of pressing projections.

In this case, at least the outer end portion in the radial direction on the inner circumferential surface of the spring body is supported by the plurality of pressing projections arranged in the circumferential direction with an interval therebetween. Accordingly, a contact pressure applied from the support body to the inner circumferential surface of the spring body can be increased, and thus a high compressive residual stress can be reliably applied to the outer end portion in the radial direction on the inner circumferential surface of the spring body.

In an axial longitudinal sectional view passing through the center axis line, the inner circumferential surface and pressing surfaces of the pressing projections may be inclined toward the same direction with respect to a horizontal surface orthogonal to the center axis line, the pressing surfaces facing the inner circumferential surface in the axial direction.

In this case, in the longitudinal sectional view, the inner circumferential surface of the spring body and the pressing surfaces of the pressing projections are inclined toward the same direction with respect to the horizontal surface, the pressing surfaces facing the inner circumferential surface in the axial direction. Accordingly, when a compressive residual stress is applied to the inner circumferential surface of the spring body, application of an excessively large load to the pressing surfaces from a corner part connecting the inner circumferential surface and the outer circumferential edge to each other in the spring body can be curbed, and a compressive residual stress can be easily applied to the inner circumferential surface of the spring body with a width in the radial direction.

A compressive force in the axial direction may be applied to the spring body in a state in which gaps in the axial direction are provided between the pressing surfaces and a part of the inner circumferential surface positioned inward in the radial direction from the outer end portion in the radial direction.

In this case, a compressive force in the axial direction is applied to the spring body in a state in which gaps in the axial direction are provided between the pressing surfaces and a part of the inner circumferential surface positioned inward in the radial direction from the outer end portion in the radial direction. Accordingly, when the support body and the spring body are relatively rotated around the center axis line while being brought into sliding contact with each other, a sliding resistance occurring between the pressing surfaces and the inner circumferential surface of the spring body can be curbed, and a compressive residual stress can be locally applied, for example, to the outer end portion in the radial direction on the inner circumferential surface of the spring body. In addition, when the spring body is elastically deformed in the axial direction, the amount of compressive deformation of the spring body in the axial direction can be adjusted, and thus a compressive residual stress applied to at least the outer end portion in the radial direction on the inner circumferential surface of the spring body can be easily adjusted.

A pressing surface of the pressing projection facing the inner circumferential surface in the axial direction may exhibit a curved shape projecting in the axial direction when viewed in the radial direction.

In this case, the pressing surface exhibits a curved shape projecting in the axial direction when viewed in the radial direction. Accordingly, when a compressive residual stress is applied to the inner circumferential surface of the spring body, a contact pressure applied from the pressing surfaces to the inner circumferential surface of the spring body can be reliably increased while application of a load to the pressing surfaces and the inner circumferential surface of the spring body is curbed.

The compressive residual stress may be applied to a plurality of the disc springs at the same time in a state in which the plurality of disc springs are disposed in series in the axial direction.

In this case, the compressive residual stress is applied to the plurality of disc springs at the same time. Accordingly, it is possible to efficiently obtain a plurality of disc springs in which the compressive residual stress is applied to the outer end portions of the spring bodies in the radial direction throughout the entire length in the circumferential direction.

The compressive residual stress may be applied to a plurality of the disc springs at the same time in a state in which the plurality of disc springs are disposed on the same plane, orientations of the plurality of disc springs in the axial direction being the same.

In this case, the compressive residual stress is applied to the plurality of disc springs at the same time. Accordingly, it is possible to efficiently obtain a plurality of disc springs in which the compressive residual stress is applied to the outer end portions of the spring bodies in the radial direction throughout the entire length in the circumferential direction.

A disc spring according to another aspect of the present invention includes a spring body formed into an annular shape and having an outer circumferential surface facing an outward side in a radial direction, an inner circumferential surface facing an inward side in the radial direction, an outer circumferential edge that is an end surface on the outward side in the radial direction, and an inner circumferential edge that is an end surface on the inward side in the radial direction, in which a compressive residual stress is applied to at least an outer end portion in the radial direction on the inner circumferential surface throughout an entire length in a circumferential direction around a center axis line of the spring body, the compressive residual stress is maximized on the inner circumferential surface and decreases toward the outer circumferential surface, and a surface roughness of a part of the inner circumferential surface to which the compressive residual stress is applied is smaller than a surface roughness of a part inward therefrom in the radial direction.

According to the aspect, since a compressive residual stress is applied to the outer end portion of the spring body in the radial direction such that the compressive residual stress is maximized on the inner circumferential surface where the highest tensile stress is generated at the time of using the disc spring and decreases toward the outer circumferential surface throughout the entire length in the circumferential direction, durability of the disc spring can be improved.

On the inner circumferential surface of the spring body, the surface roughness of the outer end portion in the radial direction where the highest tensile stress is generated at the time of using the disc spring is smaller than the surface roughness of a part positioned inward in the radial direction from a part to which the compressive residual stress is applied. Accordingly, it is possible to curb, for example due to a flaw, uneven surface roughness, or the like, generation of a stress concentration area in the outer end portion in the radial direction on the inner circumferential surface of the spring body at the time of using the disc spring, and to reduce a possibility of damage to the member supporting the outer end portion in the radial direction on the inner circumferential surface of the spring body.

A disc spring according to still another aspect of the present invention includes a spring body that is formed into an annular shape and having an outer circumferential surface facing an outward side in a radial direction, an inner circumferential surface facing an inward side in the radial direction, an outer circumferential edge that is an end surface on the outward side in the radial direction, and an inner circumferential edge that is an end surface on the inward side in the radial direction, in which a compressive residual stress is applied to at least an outer end portion in the radial direction on the inner circumferential surface throughout an entire length in a circumferential direction around a center axis line of the spring body, the compressive residual stress is maximized on the inner circumferential surface and decreases toward the outer circumferential surface, and a hardness of a part of the inner circumferential surface to which the compressive residual stress is applied is higher than a hardness of a part inward therefrom in the radial direction.

According to the aspect, since a compressive residual stress is applied to the outer end portion of the spring body in the radial direction such that the compressive residual stress is maximized on the inner circumferential surface where the highest tensile stress is generated at the time of using the disc spring and decreases toward the outer circumferential surface throughout the entire length in the circumferential direction, durability of the disc spring can be improved.

On the inner circumferential surface of the spring body, the hardness of the outer end portion in the radial direction where the highest tensile stress is generated at the time of using the disc spring is smaller than the hardness of a part positioned inward in the radial direction from a part to which the compressive residual stress is applied. Accordingly, it is possible to curb occurrence of abrasion in the outer end portion in the radial direction on the inner circumferential surface of the spring body at the time of using the disc spring, and also curb generation of a stress concentration area in the outer end portion, for example due to a flaw or the like.

In this constitution, a surface roughness of a part of the inner circumferential surface to which the compressive residual stress is applied may be smaller than a surface roughness of a part inward therefrom in the radial direction.

In this case, on the inner circumferential surface of the spring body, the surface roughness of the outer end portion in the radial direction where the highest tensile stress is generated at the time of using the disc spring is smaller than the surface roughness of a part positioned inward in the radial direction from a part to which the compressive residual stress is applied. Accordingly, it is possible to curb, for example due to a flaw, uneven surface roughness, or the like, generation of a stress concentration area in the outer end portion in the radial direction on the inner circumferential surface of the spring body at the time of using the disc spring, and to reduce a possibility of damage to the member supporting the outer end portion in the radial direction on the inner circumferential surface of the spring body.

Advantageous Effects of Invention

According to this invention, it is possible to obtain a disc spring in which a compressive residual stress is applied to an outer end portion of a spring body in a radial direction such that the compressive residual stress is maximized on an inner circumferential surface where the highest tensile stress is generated at the time of using the disc spring and decreases toward an outer circumferential surface throughout the entire length in a circumferential direction.

DESCRIPTION OF EMBODIMENTS

First Embodiment

Figure 1:
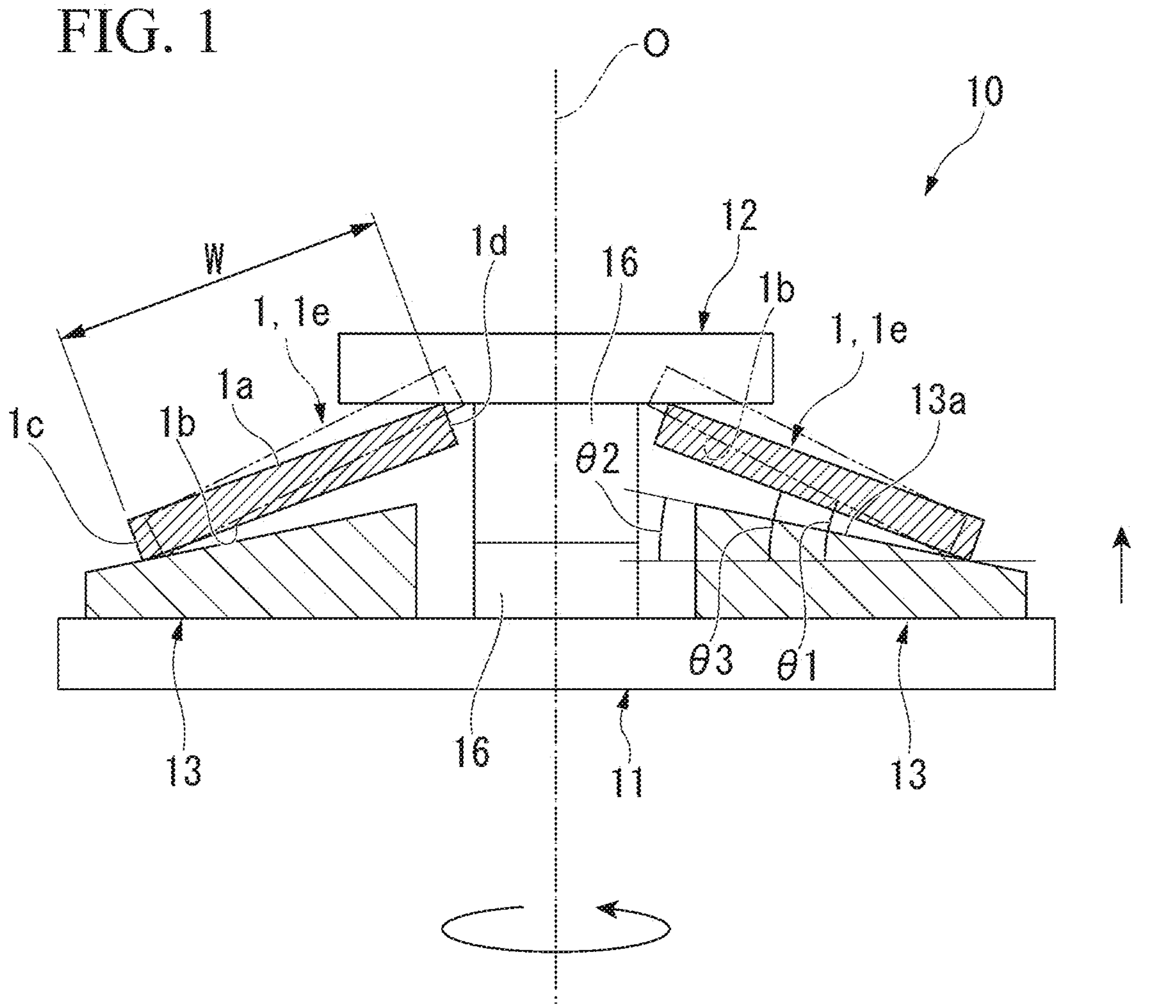
FIG. 1 is an explanatory view of a disc spring manufacturing method described as a first embodiment according to the present invention.

Hereinafter, a first embodiment of a disc spring manufacturing method and a disc spring according to the present invention will be described with reference to FIG. 1.

A disc spring 1 is formed by machining a metal plate material. A spring body 1*e* of the disc spring 1 is formed into an annular shape having a center axis line O.

Hereinafter, a direction along the center axis line O will be referred to as an axial direction, a direction intersecting the center axis line O when viewed in the axial direction will be referred to as a radial direction, and a direction around the center axis line O will be referred to as a circumferential direction.

The spring body 1*e* has an outer circumferential surface 1*a*, an inner circumferential surface 1*b*, an outer circumferential edge 1*c*, and an inner circumferential edge 1*d*.

The outer circumferential surface 1*a* faces an outward side in the radial direction, and the inner circumferential surface 1*b* faces an inward side in the radial direction. The outer circumferential surface 1*a* and the inner circumferential surface 1*b* are inclined with respect to the center axis line O. The spring body 1*e* is formed into an umbrella shape or a mortar shape opening in the axial direction.

The outer circumferential edge 1*c* is an end surface on the outward side in the radial direction in the spring body 1*e*, and the inner circumferential edge 1*d* is an end surface on the inward side in the radial direction in the spring body 1*e*.

The disc spring may be provided with outer claws protruding outward in the radial direction from the outer circumferential edge 1*c* or inner claws protruding inward in the radial direction from the inner circumferential edge 1*d*.

Next, a manufacturing apparatus 10 for performing the disc spring manufacturing method of the present embodiment will be described.

The manufacturing apparatus 10 applies a compressive residual stress to at least an outer end portion in the radial direction on the inner circumferential surface 1*b* of the spring body 1*e*. The manufacturing apparatus 10 includes a first support body 11 and a second support body 12 which are coaxially disposed with each other. The first support body 11 and the second support body 12 are formed into a disc shape. The first support body 11 and the second support body 12 are disposed coaxially with the center axis line O of the spring body 1*e* and support the spring body 1*e* from both sides in the axial direction. The first support body 11 and the second support body 12 are provided such that they can relatively approach and be separated in the axial direction.

The first support body 11 supports at least the outer end portion in the radial direction on the inner circumferential surface 1*b* of the spring body 1*e*, and the second support body 12 supports at least an inner end portion in the radial direction on the outer circumferential surface 1*a* of the spring body 1*e*.

The first support body 11 is rotatable around the center axis line O. The first support body 11 includes a plurality of pressing projections 13 arranged in the circumferential direction with an interval therebetween. The plurality of pressing projections 13 support at least the outer end portion in the radial direction on the inner circumferential surface 1*b* of the spring body 1*e*. The pressing projections 13 are positioned on the outward side in the radial direction from the inner circumferential edge 1*d* of the spring body 1*e*. The pressing projections 13 are provided on a surface, of the front and rear surfaces of the first support body 11, facing the second support body 12 in the axial direction. Three or more pressing projections 13 are arranged in the circumferential direction with an interval therebetween. An even number of pressing projections 13 are provided, and each of the pressing projections 13 faces another pressing projection 13 in the radial direction.

The pressing projections 13 may be formed integrally with the first support body 11. The pressing projections 13 may be fixed to the first support body 11 by means of a screw or the like. The pressing projections 13 may not be provided in the first support body 11.

As illustrated in FIG. 1, in an axial longitudinal sectional view passing through the center axis line O and a center portion of the pressing projection 13 in the circumferential direction, the inner circumferential surface 1*b* of the spring body 1*e* faces pressing surfaces 13*a* of the pressing projections 13 and the inner circumferential surface 1*b* and the pressing surfaces 13*a* are inclined toward the same direction with respect to a horizontal surface orthogonal to the center axis line O. The pressing surfaces 13*a* may extend along the horizontal surface in the longitudinal sectional view.

In the longitudinal sectional view, an inclination angle θ2 of the pressing surface 13*a* with respect to the horizontal surface is smaller than an inclination angle θ1 of the inner circumferential surface 1*b* of the spring body 1*e* with respect to the horizontal surface when the spring body 1*e* is not elastically deformed in the axial direction. The inclination angles θ1 and θ2 may be the same as each other.

The pressing surface 13*a* exhibits a curved shape projecting in the axial direction when viewed in the radial direction, and the pressing projection 13 is formed into a halved columnar shape extending in the radial direction.

The first support body 11 and the second support body 12 are respectively provided with restriction portions 16 protruding in a direction in which they face each other in the axial direction. The restriction portions 16 abut each other in the axial direction when the first support body 11 and the second support body 12 move closer to each other in the axial direction and restrict any further movement of the first support body 11 and the second support body 12 closer to each other in the axial direction. Accordingly, the amount of elastic deformation of the spring body 1*e* in a compression direction of the spring body 1*e* in the axial direction is prescribed. The restriction portions 16 are disposed coaxially with the center axis line O and are inserted through the inside of the spring body 1*e*. Outer circumferential surfaces of the restriction portions 16 abut or are close to the inner circumferential edge 1*d* of the spring body 1*e*.

The restriction portion 16 may not be provided or may be provided in only one of the first support body 11 and the second support body 12. In addition, a constitution in which the amount of elastic deformation of the spring body 1*e* is prescribed by abutting the restriction portion and the outer circumferential edge 1*c* of the spring body 1*e* each other may be employed.

Next, the disc spring manufacturing method will be described.

First, the disc spring 1 is subjected to shot-peening machining. The disc spring 1 may not be subjected to shot-peening machining.

Next, in a state in which a compressive force in the axial direction is applied to the spring body 1*e* using the first support body 11 and the second support body 12, the first support body 11 and the spring body 1*e* are relatively rotated around the center axis line O while being brought into sliding contact with each other. Accordingly, a compressive residual stress is applied to at least the outer end portion in the radial direction on the inner circumferential surface 1*b* of the spring body 1*e* throughout the entire length in the circumferential direction.

In the illustrated example, when a compressive force in the axial direction is applied to the spring body 1*e*, the first support body 11 and the second support body 12 are moved closer to each other in the axial direction, and the restriction portions 16 of the first support body 11 and the second support body 12 are caused to abut each other in the axial direction. Accordingly, the spring body 1*e* is elastically deformed by a prescribed amount in the compression direction in the axial direction, and a tensile stress is generated on the inner circumferential surface 1*b* of the spring body 1*e*. The spring body 1*e* may not be elastically deformed in the axial direction.

At this time, gaps in the axial direction are provided between the pressing surfaces 13*a* of the pressing projections 13 and a part of the inner circumferential surface 1*b* of the spring body 1*e* positioned inward in the radial direction from the outer end portion in the radial direction. That is, even when the spring body 1*e* is elastically deformed in the compression direction in the axial direction, in the longitudinal sectional view, the inclination angle θ2 of the pressing surface 13*a* with respect to the horizontal surface is smaller than an inclination angle θ3 of the inner circumferential surface 1*b* of the spring body 1*e* with respect to the horizontal surface.

At this time, when the spring body 1*e* is elastically deformed in the axial direction, the inclination angles θ2 and θ3 may be the same as each other, and gaps in the axial direction may not be provided between the pressing surfaces 13*a* and the part of the inner circumferential surface 1*b* of the spring body 1*e* positioned inward in the radial direction from the outer end portion in the radial direction.

When the first support body 11 is rotated around the center axis line O with respect to the spring body 1*e* in a state in which a compressive force in the axial direction is applied to the spring body 1*e* using the first support body 11 and the second support body 12, rotative movement of the spring body 1*e* with respect to the second support body 12 is restricted due to a frictional force generated between the spring body 1*e* and the second support body 12, and the pressing surfaces 13*a* slidingly move on the inner circumferential surface 1*b* of the spring body 1*e* in the circumferential direction.

At this time, the surface roughness of a part of the second support body 12 abutting the spring body 1*e* is greater than the surface roughness of a part of the first support body 11 abutting the spring body 1*e*. The former surface roughness may be equal to or smaller than the latter surface roughness.

In addition, at this time, the outer end portion in the radial direction on the inner circumferential surface 1*b* of the spring body 1*e* is rubbed almost without abrasion (several μm at the most), and thus the surface roughness of the spring body 1*e* becomes smaller than that before relative rotation of the first support body 11 and the spring body 1*e*. For instance, even if abrasion occurs, a distribution of the compressive residual stress in a thickness direction does not change due to only this abrasion.

In addition, at this time, the hardness of the outer end portion in the radial direction on the inner circumferential surface 1*b* of the spring body 1*e* becomes higher than that before relative rotation of the first support body 11 and the spring body 1*e*.

In the disc spring 1 formed as described above, a compressive residual stress in the outer end portion of the spring body 1*e* in the radial direction is maximized on the inner circumferential surface 1*b* where the highest tensile stress is generated at the time of using the disc spring 1 and decreases toward the outer circumferential surface 1*a* throughout the entire length in the circumferential direction.

A part, which is brought into sliding contact with the first support body 11 and to which a compressive residual stress is applied, of the inner circumferential surface 1*b* of the spring body 1*e* is disposed within a range from a connection part of the inner circumferential surface 1*b* to the outer circumferential edge 1*c* to a position inward in the radial direction from the connection part by 30% of the width W of the spring body 1*e*, preferably by 20% the width W. The width W of the spring body 1*e* is the distance between the outer circumferential edge 1*c* and the inner circumferential edge 1*d* along the inner circumferential surface 1*b* in the longitudinal sectional view.

If a part, to which a compressive residual stress is applied, of the inner circumferential surface 1*b* of the spring body 1*e* is disposed inward in the radial direction exceeding 30% of the width W of the spring body 1*e* from the connection part to the outer circumferential edge 1*c*, it is difficult to increase the compressive residual stress to a desired level.

Moreover, in the disc spring 1, the surface roughness of a part of the inner circumferential surface 1*b* to which a compressive residual stress applied is smaller than the surface roughness of a part of the inner circumferential surface 1*b* positioned inward in the radial direction from the above part.

In addition, in the disc spring 1, the hardness of a part of the inner circumferential surface 1*b* to which a compressive residual stress applied is higher than the hardness of a part of the inner circumferential surface 1*b* positioned inward in the radial direction from the above part.

The surface roughness of a part of the inner circumferential surface 1*b* to which a compressive residual stress applied may be smaller than the surface roughness of a part of the inner circumferential surface 1*b* positioned inward in the radial direction from the above part, and the hardness of a part of the inner circumferential surface 1*b* to which a compressive residual stress applied may be equal to or lower than the hardness of a part of the inner circumferential surface 1*b* positioned inward in the radial direction from the above part.

In addition, the surface roughness of a part of the inner circumferential surface 1*b* to which a compressive residual stress applied may be equal to or greater than the surface roughness of a part of the inner circumferential surface 1*b* positioned inward in the radial direction from the above part, and the hardness of a part of the inner circumferential surface 1*b* to which a compressive residual stress applied may be higher than the hardness of a part of the inner circumferential surface 1*b* positioned inward in the radial direction from the above part.

As described above, according to the disc spring manufacturing method of the present embodiment, a compressive residual stress is applied to at least the outer end portion in the radial direction on the inner circumferential surface 1*b* of the spring body 1*e* by relatively rotating the first support body 11 and the spring body 1*e* around the center axis line O while being brought into sliding contact with each other in a state in which a compressive force in the axial direction is applied to the spring body 1*e* using the first support body 11 supporting at least the outer end portion in the radial direction on the inner circumferential surface 1*b* of the spring body 1*e*.

Therefore, it is possible to reliably obtain the disc spring 1 in which a compressive residual stress is applied to the outer end portion of the spring body 1*e* in the radial direction such that the compressive residual stress is maximized on the inner circumferential surface 1*b* where the highest tensile stress is generated at the time of using the disc spring 1 and decreases toward the outer circumferential surface 1*a* throughout the entire length in the circumferential direction.

When a compressive force in the axial direction is applied to the spring body 1*e* using the first support body 11, the spring body 1*e* is elastically deformed in the axial direction, and at least the outer end portion in the radial direction on the inner circumferential surface 1*b* of the spring body 1*e* is pulled. Accordingly, a high compressive residual stress can be reliably applied to the outer end portion in the radial direction on the inner circumferential surface 1*b* of the spring body 1*e*.

At least the outer end portion in the radial direction on the inner circumferential surface 1*b* of the spring body 1*e* is supported by the plurality of pressing projections 13 arranged in the circumferential direction with an interval therebetween. Accordingly, a contact pressure applied from the first support body 11 to the inner circumferential surface 1*b* of the spring body 1*e* can be increased, and thus a high compressive residual stress can be reliably applied to the outer end portion in the radial direction on the inner circumferential surface 1*b* of the spring body 1*e*.

In the longitudinal sectional view, the inner circumferential surface 1*b* of the spring body 1*e* and the pressing surfaces 13*a* of the pressing projections 13 are inclined toward the same direction with respect to the horizontal surface, the pressing surfaces 13*a* facing the inner circumferential surface 1*b* in the axial direction. Accordingly, when a compressive residual stress is applied to the inner circumferential surface 1*b* of the spring body 1*e*, application of an excessively large load to the pressing surfaces 13*a* from a corner part connecting the inner circumferential surface 1*b* and the outer circumferential edge 1*c* to each other in the spring body 1*e* can be curbed, and a compressive residual stress can be easily applied to the inner circumferential surface 1*b* of the spring body 1*e* with a width in the radial direction.

A compressive force in the axial direction is applied to the spring body 1*e* in a state in which gaps in the axial direction are provided between the pressing surfaces 13*a* and a part of the inner circumferential surface 1*b* of the spring body 1*e* positioned inward in the radial direction from the outer end portion in the radial direction. Accordingly, when the first support body 11 and the spring body 1*e* are relatively rotated around the center axis line O while being brought into sliding contact with each other, a sliding resistance occurring between the pressing surfaces 13*a* and the inner circumferential surface 1*b* of the spring body 1*e* can be curbed, and a compressive residual stress can be locally applied, for example, to the outer end portion in the radial direction on the inner circumferential surface 1*b* of the spring body 1*e*. In addition, the amount of compressive deformation of the spring body 1*e* in the axial direction can be adjusted, and thus a compressive residual stress applied to at least the outer end portion in the radial direction on the inner circumferential surface 1*b* of the spring body 1*e* can be easily adjusted.

The pressing surface 13*a* exhibits a curved shape projecting in the axial direction when viewed in the radial direction. Accordingly, when a compressive residual stress is applied to the inner circumferential surface 1*b* of the spring body 1*e*, a contact pressure applied from the pressing surfaces 13*a* to the inner circumferential surface 1*b* of the spring body 1*e* can be reliably increased while application of a load to the pressing surfaces 13*a* and the inner circumferential surface 1*b* of the spring body 1*e* is curbed.

According to the disc spring 1 of the present embodiment, since a compressive residual stress is applied to the outer end portion of the spring body 1*e* in the radial direction such that the compressive residual stress is maximized on the inner circumferential surface 1*b* where the highest tensile stress is generated at the time of using the disc spring 1 and decreases toward the outer circumferential surface 1*a* throughout the entire length in the circumferential direction, durability of the disc spring 1 can be improved.

On the inner circumferential surface 1*b* of the spring body 1*e*, the surface roughness of the outer end portion in the radial direction where the highest tensile stress is generated at the time of using the disc spring 1 is smaller than the surface roughness of a part positioned inward in the radial direction from a part to which the compressive residual stress is applied. Accordingly, it is possible to curb, for example due to a flaw, uneven surface roughness, or the like, generation of a stress concentration area in the outer end portion in the radial direction on the inner circumferential surface 1*b* of the spring body 1*e* at the time of using the disc spring 1, and to reduce a possibility of damage to the member supporting the outer end portion in the radial direction on the inner circumferential surface 1*b* of the spring body 1*e*.

On the inner circumferential surface 1*b* of the spring body 1*e*, the hardness of the outer end portion in the radial direction where the highest tensile stress is generated at the time of using the disc spring 1 is smaller than the hardness of a part positioned inward in the radial direction from a part to which the compressive residual stress is applied. Accordingly, it is possible to curb occurrence of abrasion in the outer end portion in the radial direction on the inner circumferential surface 1*b* of the spring body 1*e* at the time of using the disc spring 1, and also curb generation of a stress concentration area in the outer end portion, for example due to a flaw or the like.

Next, regarding the disc springs of examples and comparative examples, a distribution of compressive residual stresses in the thickness direction will be described.

First, each of the disc springs of Examples 1 and 2 and Comparative Examples 1 to 3 was subjected to shot-peening machining under the same conditions.

Next, in Examples 1 and 2, in a state in which a compressive force in the axial direction was applied to the spring body 1*e* using the first support body 11 and the second support body 12, the first support body 11 and the spring body 1*e* were relatively rotated around the center axis line O while they were brought into sliding contact with each other. In Comparative Examples 1 and 2, a ball rotatably supported by a first support body was provided and, in a state in which a compressive force in the axial direction was applied to the spring body by pressing the ball against the outer end portion in the radial direction on the inner circumferential surface of the spring body, the first support body was rotated around the center axis line O with respect to the spring body while the ball was being rotated.

When a compressive force in the axial direction was applied to the spring body, in Example 1 and Comparative Example 1, the spring body was elastically deformed in a compression direction in the axial direction, and in Example 2 and Comparative Example 2, the spring body was not elastically deformed in the axial direction.

In Comparative Example 3, only shot-peening machining was performed.

Figure 2:
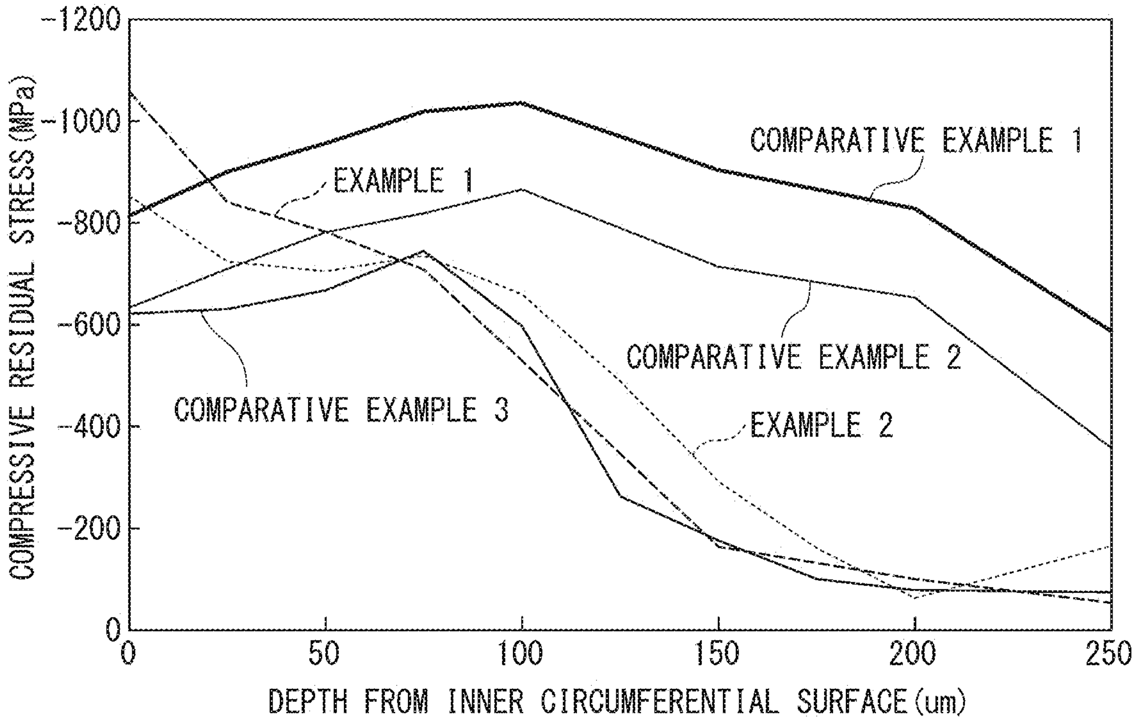
FIG. 2 is a graph showing a distribution of compressive residual stresses of disc springs in a thickness direction according to examples and comparative examples.

As a result, as illustrated in FIG. 2, in Examples 1 and 2, it was confirmed that a compressive residual stress applied to the outer end portion of the spring body 1*e* in the radial direction was maximized on the inner circumferential surface 1*b* where the depth was zero and decreased toward the outer circumferential surface 1*a*. In Comparative Examples 1 to 3, it was confirmed that a compressive residual stress was maximized at a depth position between the inner circumferential surface and the outer circumferential surface and was not maximized on the inner circumferential surface where the depth was zero.

In addition, it was confirmed that, in both Examples 1 and 2, the compressive residual stress on the inner circumferential surface 1*b* where the depth was zero became greater than that in Comparative Example 3, and further increased after shot-peening machining, and that the compressive residual stress was greater in Example 1 than that in Example 2.

Second Embodiment

A second embodiment of the disc spring manufacturing method according to the present invention will be described with reference to FIGS. 3 to 5B. In the description of the present embodiment, the same reference signs are applied to constituents similar to those of the foregoing first embodiment, a description thereof will be omitted, and only different points will be described.

In the present embodiment, the compressive residual stress is applied to a plurality of disc springs 1 at the same time in a state in which the plurality of disc springs 1 are disposed in series in the axial direction. In addition, the plurality of disc springs 1 are disposed such that orientations of the plurality of disc springs 1 in the axial direction are the same.

Figure 3:
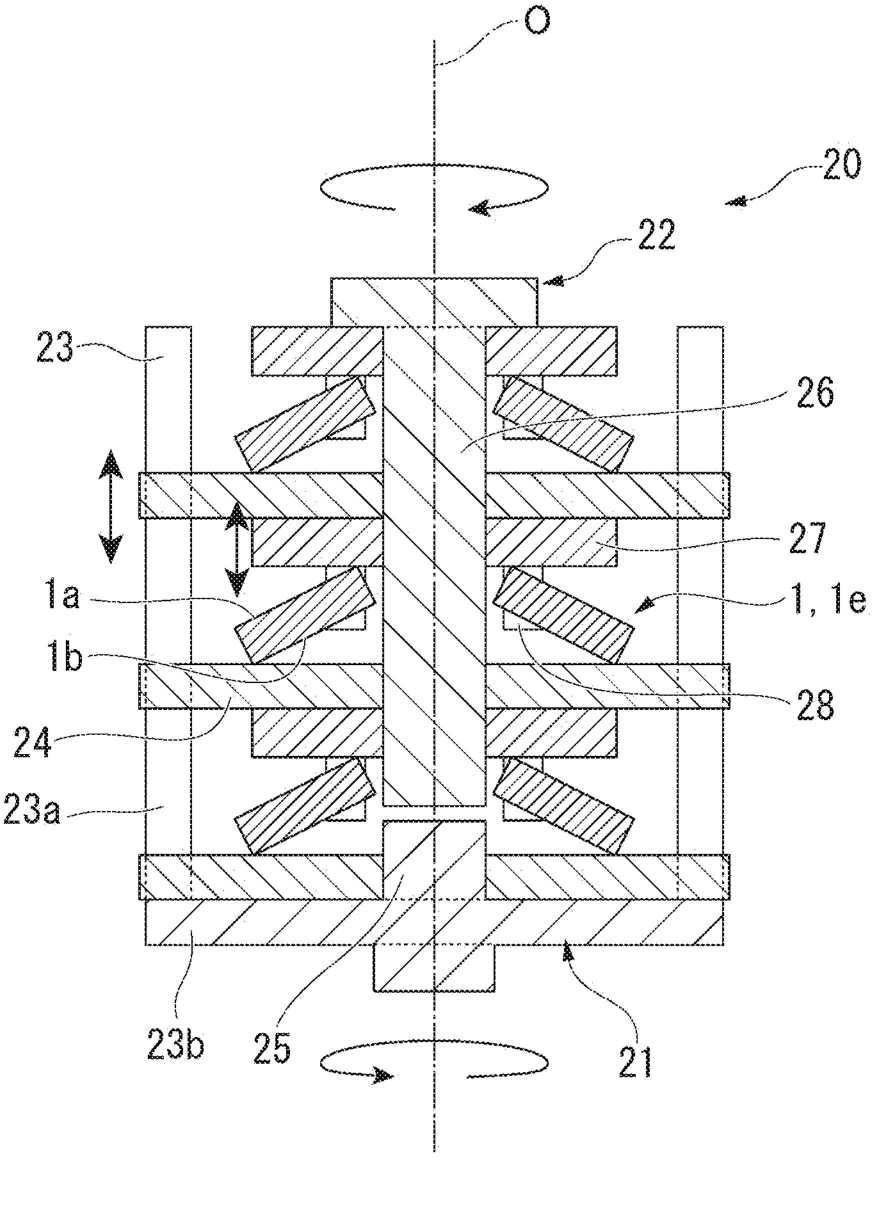
FIG. 3 is an explanatory view of a disc spring manufacturing method described as a second embodiment according to the present invention.

As illustrated in FIG. 3, a manufacturing apparatus 20 for performing the disc spring manufacturing method of the present embodiment includes a first support body 21 and a second support body 22. Each of the first support body 21 and the second support body 22 is rotatable around the center axis line O.

The first support body 21 has a bottomed cylindrical body portion 23 and a plurality of press members 24.

The body portion 23 has a cylindrical circumferential wall portion 23*a* and a disc-shaped bottom portion 23*b* connected to a lower end of the circumferential wall portion 23*a*. The body portion 23 is disposed coaxially with the center axis line O of the spring body 1*e*. An annular lid (not illustrated) is detachably attached to an upper end of the circumferential wall portion 23*a*.

Figure 4A:
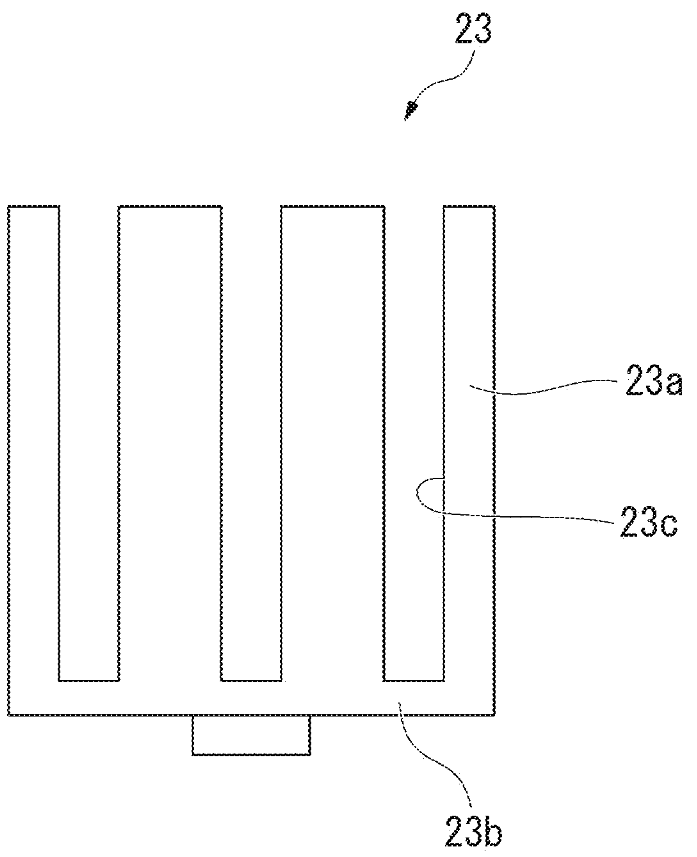
FIG. 4A is a side view of a body portion of a first support body of a manufacturing apparatus for performing the disc spring manufacturing method described as the second embodiment according to the present invention.

As illustrated in FIG. 4A, a plurality of engagement holes (slits) 23*c* are formed in the circumferential wall portion 23*a* with an interval therebetween in the circumferential direction. The engagement holes 23*c* extend in the axial direction. The engagement holes 23*c* may be provided in a center portion of the circumferential wall portion 23*a* in the axial direction without extending to an end portion of the circumferential wall portion 23*a* in the axial direction. The engagement holes 23*c* may extend in the axial direction throughout the entire region of the circumferential wall portion 23*a*. In addition, in place of the engagement holes 23*c*, engagement grooves recessed from the inner circumferential surface toward the outer circumferential surface of the circumferential wall portion 23*a* may be provided. The strength of the circumferential wall portion 23*a* is improved when the engagement grooves are provided.

The press member 24 is formed into a disc shape. The press member 24 is disposed coaxially with the center axis line O of the spring body 1*e*. The plurality of press members 24 are arranged in the axial direction with an interval therebetween. The press member 24 supports at least the outer end portion in the radial direction on the inner circumferential surface 1*b* of the spring body 1*e*.

Figure 4B:
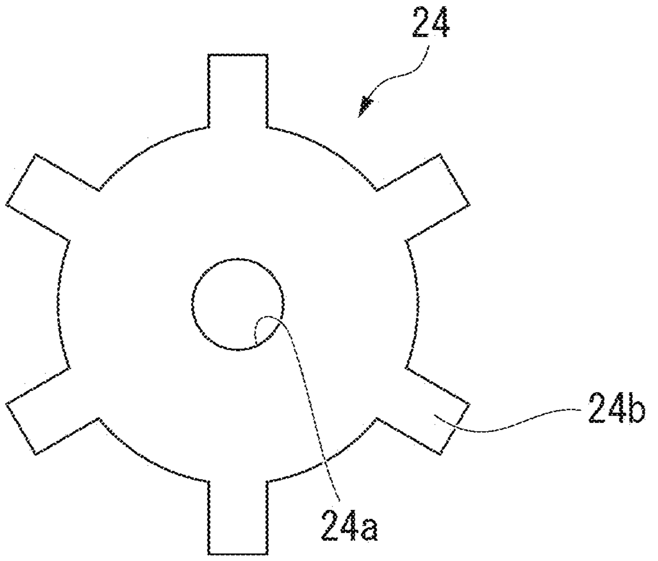
FIG. 4B is a plan view of a press member of the first support body of the manufacturing apparatus for performing the disc spring manufacturing method described as the second embodiment according to the present invention.

As illustrated in FIG. 4B, a hole portion 24*a* is formed at the center of the press member 24 in the radial direction. A restriction portion 25 (which will be described below) is inserted through the hole portion 24*a* of the press member 24, among the plurality of press members 24, disposed closest to the bottom portion 23*b*, and a shaft portion 26 (which will be described below) of the second support body 22 is inserted through the hole portions 24*a* of the other press members 24. A plurality of engagement claws 24*b* are provided at an outer circumferential edge of the press member 24 with an interval therebetween in the circumferential direction. The engagement claws 24*b* protrude outward in the radial direction from the outer circumferential edge of the press member 24.

The press members 24 are disposed inside the body portion 23. At this time, the engagement claws 24*b* respectively engage with the engagement holes 23*c*. Accordingly, the press members 24 are attached to the body portion 23 such that the press members 24 are unable to relatively rotate with respect to the body portion 23 and able to relatively move in the axial direction with respect to the body portion 23. Therefore, the body portion 23 and the press members 24 rotate together.

The restriction portion 25 is provided in the first support body 21. The restriction portion 25 is disposed coaxially with the center axis line O. The restriction portion 25 protrudes from the center of the bottom portion 23*b* of the body portion 23 in the radial direction toward the shaft portion 26.

The second support body 22 has the shaft portion 26 and a plurality of flat plate portions 27.

The shaft portion 26 is disposed coaxially with the center axis line O. The shaft portion 26 is inserted into the inward side of the spring body 1*e*.

Figure 5A:
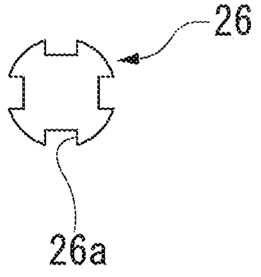
FIG. 5A is a plan view of a shaft portion of a second support body of the manufacturing apparatus for performing the disc spring manufacturing method described as the second embodiment according to the present invention.

As illustrated in FIG. 5A, a plurality of engagement grooves 26*a* are formed on the outer circumferential surface of the shaft portion 26 with an interval therebetween in the circumferential direction. The engagement grooves 26*a* extend in the axial direction.

The flat plate portion 27 is formed into a disc shape. The flat plate portion 27 is disposed coaxially with the center axis line O of the spring body 1*e*. The plurality of flat plate portions 27 are arranged in the axial direction with an interval therebetween. The flat plate portion 27 supports at least the inner end portion in the radial direction on the outer circumferential surface 1*a* of the spring body 1*e*.

Figure 5B:
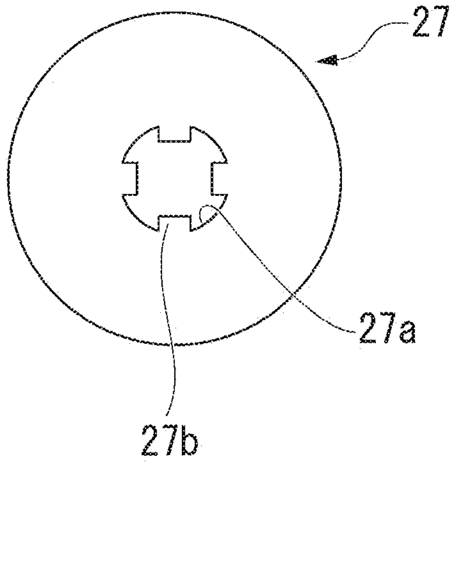
FIG. 5B is a plan view of a flat plate portion of the second support body of the manufacturing apparatus for performing the disc spring manufacturing method described as the second embodiment according to the present invention.

As illustrated in FIG. 5B, a hole portion 27*a* is formed at the center of the flat plate portion 27 in the radial direction. A plurality of engagement claws 27*b* are provided on a circumferential surface of the hole portion 27*a* with an interval therebetween in the circumferential direction. The engagement claws 27*b* protrude inward in the radial direction from the circumferential surface of the hole portion 27*a*. The shaft portion 26 is inserted through the hole portion 27*a*. At this time, the engagement claws 27*b* respectively engage with the engagement grooves 26*a*. Accordingly, the flat plate portions 27 are attached to the shaft portion 26 such that the flat plate portions 27 are unable to relatively rotate with respect to the shaft portion 26 and able to relatively move in the axial direction with respect to the shaft portion 26. Therefore, the shaft portion 26 and the flat plate portions 27 rotate together.

Rotation stoppers 28 are provided in the flat plate portion 27. The rotation stoppers 28 restrict rotative movement of the spring body 1*e* with respect to the second support body 22 around the center axis line O. The rotation stopper 28 is provided on a surface (in the illustrated example, a surface on the bottom portion 23*b* side) of the front and rear surfaces of the flat plate portion 27, the surface facing the outer circumferential surface 1*a* of the spring body 1*e*. In the present embodiment, a plurality of inner claws are provided at an inner circumferential edge of the spring body 1*e* with an interval therebetween in the circumferential direction, and the rotation stopper 28 is disposed between the inner claws adjacent to each other in the circumferential direction.

When inner claws are not provided in the spring body 1*e*, a constitution in which the inner end portion of the spring body 1*e* in the radial direction is sandwiched from both sides in the axial direction may be employed as the rotation stopper 28.

Alternatively, without providing the rotation stopper 28, rotative movement of the spring body 1*e* with respect to the second support body 22 may be restricted by means of a frictional force generated between the spring body 1*e* and the flat plate portions 27.

The press members 24 and the flat plate portions 27 are alternately disposed and the shaft portion 26 is inserted through the press members 24 and the flat plate portions 27. The press member 24 and the flat plate portion 27 are disposed with an interval therebetween in the axial direction. The spring body 1*e* is disposed between the press member 24 and the flat plate portion 27. The spring body 1*e* is supported by the press member 24 and the flat plate portion 27 from both sides in the axial direction. Specifically, the press member 24 supports at least the outer end portion in the radial direction on the inner circumferential surface 1*b* of the spring body 1*e*, and the flat plate portion 27 supports at least the inner end portion in the radial direction on the outer circumferential surface 1*a* of the spring body 1*e*.

The press members 24 and the flat plate portions 27 can move in the axial direction. That is, the press members 24 and the flat plate portions 27 are provided such that they can relatively approach and be separated in the axial direction.

In order to reduce friction due to sliding movement between the press member 24 and the flat plate portion 27, the surface roughness of a part of the press member 24 abutting the flat plate portion 27 may be smaller than the surface roughness of other parts, and the surface roughness of a part of the flat plate portion 27 abutting the press member 24 may be smaller than the surface roughness of other parts. A thrust bearing may be provided between the press member 24 and the flat plate portion 27.

The restriction portion 25 and the shaft portion 26 abut each other in the axial direction when the first support body 21 and the second support body 22 move closer to each other in the axial direction and restrict any further movement of the first support body 21 and the second support body 22 closer to each other in the axial direction. That is, the shaft portion 26 also functions as a restriction portion.

Next, the disc spring manufacturing method using the manufacturing apparatus 20 will be described.

First, the disc spring 1 is subjected to shot-peening machining. Next, in a state in which a compressive force in the axial direction is applied to the spring bodies 1*e* using the first support body 21 and the second support body 22, the first support body 21 and the spring bodies 1*e* are relatively rotated around the center axis line O while they are brought into sliding contact with each other. Accordingly, a compressive residual stress is applied to at least the outer end portions in the radial direction on the inner circumferential surfaces 1*b* of the spring bodies 1*e* throughout the entire length in the circumferential direction.

In the illustrated example, when a compressive force in the axial direction is applied to the spring bodies 1*e*, the first support body 21 and the second support body 22 are moved closer to each other in the axial direction, and the restriction portion 25 of the first support body 21 and the shaft portion 26 of the second support body 22 are caused to abut each other in the axial direction. Accordingly, each spring body 1*e* is elastically deformed by a prescribed amount in a compression direction in the axial direction, and a tensile stress is generated on the inner circumferential surface 1*b* of each spring body 1*e*.

In addition, in a state in which a compressive force in the axial direction is applied to the spring bodies 1*e* using the first support body 21 and the second support body 22, the first support body 21 is rotated in one direction around the center axis line O, and the second support body 22 is rotated in the other direction around the center axis line O. Since rotative movement of the spring bodies 1*e* with respect to the second support body 22 around the center axis line O is restricted by the rotation stoppers 28, the spring bodies 1*e* rotate in the other direction around the center axis line O in accordance with the rotation of the second support body 22. Accordingly, the press member 24 slidingly move on the inner circumferential surface 1*b* of the spring body 1*e* in the circumferential direction.

According to the disc spring manufacturing method of the present embodiment, a compressive residual stress is applied to at least the outer end portions in the radial direction on the inner circumferential surfaces 1*b* of the spring bodies 1*e* by relatively rotating the first support body 21 and the spring bodies 1*e* around the center axis line O while they are brought into sliding contact with each other in a state in which a compressive force in the axial direction is applied to the spring bodies 1*e* using the first support body 21 supporting at least the outer end portions in the radial direction on the inner circumferential surfaces 1*b* of the spring bodies 1*e*.

Therefore, it is possible to reliably obtain the disc spring 1 in which a compressive residual stress is applied to the outer end portion of the spring body 1*e* in the radial direction such that the compressive residual stress is maximized on the inner circumferential surface 1*b* where the highest tensile stress is generated at the time of using the disc spring 1 and decreases toward the outer circumferential surface 1*a* throughout the entire length in the circumferential direction.

In addition, according to the disc spring manufacturing method of the present embodiment, since the compressive residual stress is applied to a plurality of disc springs 1 at the same time, it is possible to efficiently obtain a plurality of disc springs 1 in which the compressive residual stress is applied to the outer end portions of the spring bodies 1*e* in the radial direction throughout the entire length in the circumferential direction.

Third Embodiment

Next, a third embodiment of the disc spring manufacturing method according to the present invention will be described with reference to FIG. 6. In the description of the present embodiment, the same reference signs are applied to constituents similar to those of the foregoing second embodiment, a description thereof will be omitted, and only different points will be described.

In the present embodiment as well, similar to the second embodiment, the compressive residual stress is applied to a plurality of disc springs 1 at the same time in a state in which the plurality of disc springs 1 are disposed in series in the axial direction. In addition, in the present embodiment, the plurality of disc springs 1 are disposed such that orientations of the plurality of disc springs 1 in the axial direction are opposite one another.

A manufacturing apparatus 30 for performing the disc spring manufacturing method of the present embodiment will be described.

Figure 6:
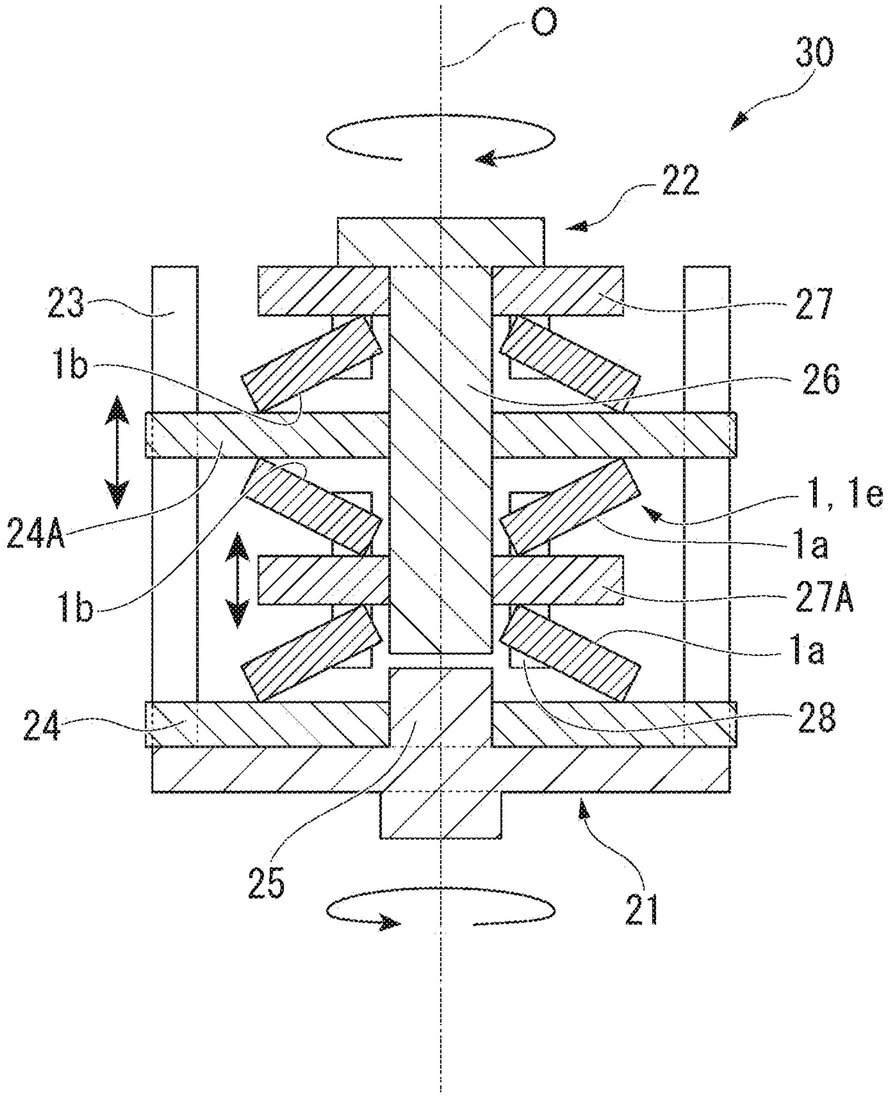
FIG. 6 is an explanatory view of a disc spring manufacturing method described as a third embodiment according to the present invention.

As illustrated in FIG. 6, in the manufacturing apparatus 30, among the plurality of press members 24 of the first support body 21, a press member 24A other than the press member 24 disposed on a side closest to the bottom portion 23*b* supports two disc springs 1. Specifically, two disc springs 1 of which orientations in the axial direction are opposite to each other are disposed so as to sandwich the press member 24A in the axial direction. At this time, the two disc springs 1 are disposed such that the inner circumferential surfaces 1*b* of the spring bodies 1*e* face the press member 24A. The press member 24A supports at least the outer end portions in the radial direction on the inner circumferential surfaces 1*b* of the spring bodies 1*e* of the two disc springs 1 on both surfaces of the press member 24A.

Among the plurality of flat plate portions 27 of the second support body 22, a flat plate portion 27A other than the flat plate portion 27 disposed on a side farthest from the bottom portion 23*b* supports two disc springs 1. Specifically, two disc springs 1 of which orientations in the axial direction are opposite to each other are disposed so as to sandwich the flat plate portion 27A in the axial direction. At this time, the two disc springs 1 are disposed such that the outer circumferential surfaces 1*a* of the spring bodies 1*e* face the flat plate portion 27A. The flat plate portion 27A supports at least the inner end portions in the radial direction on the outer circumferential surfaces 1*a* of the spring bodies 1*e* of the two disc springs 1 on both surfaces of the flat plate portion 27A. In addition, the rotation stoppers 28 are provided on both surfaces of the flat plate portion 27A.

The disc spring manufacturing method using the manufacturing apparatus 30 is similar to that of the second embodiment. That is, in a state in which a compressive force in the axial direction is applied to the spring bodies 1*e* using the first support body 21 and the second support body 22, the first support body 21 and the spring bodies 1*e* are relatively rotated around the center axis line O while they are brought into sliding contact with each other. Accordingly, a compressive residual stress is applied to at least the outer end portions in the radial direction on the inner circumferential surfaces 1*b* of the spring bodies 1*e* throughout the entire length in the circumferential direction.

According to the disc spring manufacturing method of the present embodiment, it is possible to exhibit effects similar to those of the second embodiment. That is, it is possible to reliably obtain the disc spring 1 in which a compressive residual stress is applied to the outer end portion of the spring body 1*e* in the radial direction throughout the entire length in the circumferential direction such that the compressive residual stress is maximized on the inner circumferential surface 1*b* where the highest tensile stress is generated at the time of using the disc spring 1 and decreases toward the outer circumferential surface 1*a*. In addition, since the compressive residual stress is applied to a plurality of disc springs 1 at the same time, it is possible to efficiently obtain a plurality of disc springs 1 in which the compressive residual stress is applied to the outer end portions of the spring bodies 1*e* in the radial direction throughout the entire length in the circumferential direction.

Moreover, according to the present embodiment, since one press member 24 (24A) supports two disc springs 1 and one flat plate portion 27 (27A) supports two disc springs 1, the number of components of the press members 24 and the flat plate portions 27 can be reduced. Therefore, the constitutions of the first support body 21 and the second support body 22 can be simplified. In addition, the dimension of the manufacturing apparatus 30 in the axial direction can be shortened.

Fourth Embodiment

A fourth embodiment of the disc spring manufacturing method according to the present invention will be described with reference to FIG. 7. In the description of the present embodiment, the same reference signs are applied to constituents similar to those of the foregoing first to third embodiments, a description thereof will be omitted, and only different points will be described.

In the present embodiment, the compressive residual stress is applied to a plurality of disc springs 1 at the same time in a state in which the plurality of disc springs 1 are disposed on the same plane, orientations of the plurality of disc springs 1 in the axial direction being the same.

A manufacturing apparatus 40 for performing the disc spring manufacturing method of the present embodiment will be described.

Figure 7:
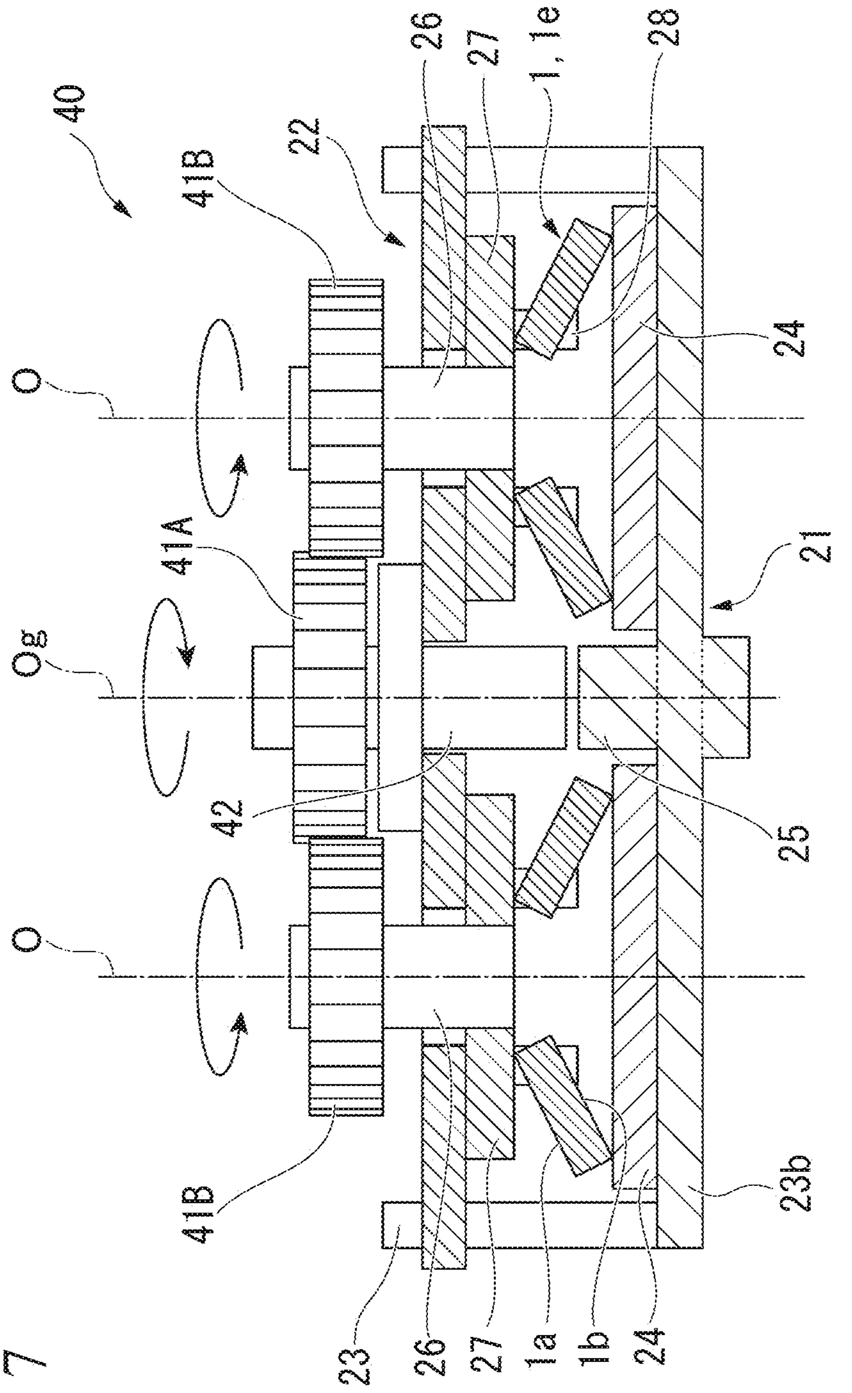
FIG. 7 is an explanatory view of a disc spring manufacturing method described as a fourth embodiment according to the present invention.

As illustrated in FIG. 7, in the manufacturing apparatus 40, the body portion 23 of the first support body 21 is disposed coaxially with a rotation axis line Og different from the center axis line O of the spring body 1*e*. The plurality of disc springs 1 are disposed on the same plane and are arranged with an interval therebetween in a circumferential direction around the rotation axis line Og. The shaft portion 26, the flat plate portion 27, and the press member 24 are provided for each of the plurality of disc springs 1. The shaft portion 26, the flat plate portion 27, and the press member 24 are disposed coaxially with the center axis line O of the disc spring 1.

In the present embodiment, the press member 24 is provided for each disc spring 1, but one press member 24 may be provided for all of the plurality of disc springs 1.

The second support body 22 further includes a rotation shaft portion 42 that is disposed coaxially with the rotation axis line Og. A drive gear 41A is provided in an upper end portion of the rotation shaft portion 42. In addition, driven gears 41B meshed with the drive gear 41A are provided in upper end portions of the shaft portions 26. When the rotation shaft portion 42 is rotated in one direction around the rotation axis line Og, the shaft portions 26 rotate in the other direction around the center axis line O. In addition, in accordance with the rotation of the shaft portions 26, the flat plate portions 27 and the spring bodies 1*e* also rotate in the other direction around the center axis line O. Therefore, a plurality of spring main bodies 1*e* can be rotated around the center axis line O at the same time by rotating the rotation shaft portion 42.

In the present embodiment, the first support body 21 does not rotate. The press member 24 is fixed to the bottom portion 23*b* of the body portion 23 so as not to rotate. In addition, the restriction portion 25 is disposed coaxially with the rotation axis line Og. The restriction portion 25 protrudes from the center of the bottom portion 23*b* in the radial direction toward the rotation shaft portion 42.

Next, the disc spring manufacturing method using the manufacturing apparatus 40 will be described.

First, the disc spring 1 is subjected to shot-peening machining. Next, in a state in which a compressive force in the axial direction is applied to the spring bodies 1*e* using the first support body 21 and the second support body 22, the first support body 21 and the spring bodies 1*e* are relatively rotated around the center axis line O while they are brought into sliding contact with each other. Accordingly, a compressive residual stress is applied to at least the outer end portions in the radial direction on the inner circumferential surfaces 1*b* of the spring bodies 1*e* throughout the entire length in the circumferential direction.

In the illustrated example, when a compressive force in the axial direction is applied to the spring bodies 1*e*, the first support body 21 and the second support body 22 are moved closer to each other in the axial direction, and the restriction portion 25 of the first support body 21 and the rotation shaft portion 42 of the second support body 22 are caused to abut each other in the axial direction. Accordingly, each spring body 1*e* is elastically deformed by a prescribed amount in a compression direction in the axial direction, and a tensile stress is generated on the inner circumferential surface 1*b* of each spring body 1*e*.

In a state in which a compressive force in the axial direction is applied to the spring bodies 1*e* using the first support body 21 and the second support body 22, the rotation shaft portion 42 is rotated in one direction around the rotation axis line Og. At this time, the shaft portions 26 rotate in the other direction around the center axis line O. In accordance with the rotation of the shaft portions 26, the spring bodies 1*e* also rotate in the other direction around the center axis line O. The inner circumferential surface 1*b* of the spring body 1*e* slidingly moves on the press member 24 in the circumferential direction by rotating the spring body 1*e* around the center axis line O without rotating the first support body 21 (the press member 24).

According to the disc spring manufacturing method of the present embodiment, a compressive residual stress is applied to at least the outer end portions in the radial direction on the inner circumferential surfaces 1*b* of the spring bodies 1*e* by relatively rotating the first support body 21 and the spring bodies 1*e* around the center axis line O while they are brought into sliding contact with each other in a state in which a compressive force in the axial direction is applied to the spring bodies 1*e* using the first support body 21 supporting at least the outer end portions in the radial direction on the inner circumferential surfaces 1*b* of the spring bodies 1*e*.

Therefore, it is possible to reliably obtain the disc spring 1 in which a compressive residual stress is applied to the outer end portion of the spring body 1*e* in the radial direction such that the compressive residual stress is maximized on the inner circumferential surface 1*b* where the highest tensile stress is generated at the time of using the disc spring 1 and decreases toward the outer circumferential surface 1*a* throughout the entire length in the circumferential direction.

In addition, according to the disc spring manufacturing method of the present embodiment, since the compressive residual stress is applied to a plurality of disc springs 1 at the same time, it is possible to efficiently obtain a plurality of disc springs 1 in which the compressive residual stress is applied to the outer end portions of the spring bodies 1*e* in the radial direction throughout the entire length in the circumferential direction.

The driven gears 41B are provided in the shaft portions 26. However, driven gears may be provided in the press members 24, and the press members 24 may be rotated without rotating the shaft portions 26 (the spring bodies 1*e*). Even in this case, the first support body 21 and the spring bodies 1*e* can be relatively rotated around the center axis line O while they are brought into sliding contact with each other.

The technical scope of the present invention is not limited to the above-described embodiments, and various modifications can be made within the scope not departing from the meaning of the present invention.

For example, when an outer claw protruding outward in the radial direction is provided at the outer circumferential edge 1*c* of the spring body 1*e*, and when the outer circumferential surface 1*a* and the inner circumferential surface 1*b* of the spring body 1*e* are flush with front and rear surfaces of the outer claw, respectively, a restriction portion abutting an outer end portion of the outer claw in the radial direction may be provided in the first support body 11. In this case, a compressive residual stress can be easily applied to at least the outer end portion in the radial direction on the inner circumferential surface 1*b* of the spring body 1*e*.

In the first embodiment, a rotation stopper restricting rotative movement of the spring body 1*e* with respect to the second support body 12 around the center axis line O may be provided in the second support body 12.

For example, when a plurality of inner claws are provided at the inner circumferential edge 1*d* of the spring body 1*e* with an interval therebetween in the circumferential direction, rotation stoppers may be positioned between the inner claws adjacent to each other in the circumferential direction, and when no inner claws are provided in the spring body 1*e*, the inner end portion of the spring body 1*e* in the radial direction may be sandwiched by rotation stoppers from both sides in the axial direction.

In the first to fourth embodiments, the spring body 1*e* may not be elastically deformed in the axial direction when a compressive force in the axial direction is applied to the spring body 1*e* using the first support body 11 or 21. In this case, the outer circumferential surface 1*a* of the spring body 1*e* may be supported by the second support body 12 or 22.

In the first embodiment, at least one of the first support body 11 and the second support body 12 may be provided so as to relatively rotate around the center axis line O with respect to the other thereof.

For example, in a case in which both the first support body 11 and the second support body 12 are provided so as to rotate around the center axis line O, when the first support body 11 and the spring body 1*e* are brought into sliding contact with each other, the first support body 11 may be rotated in one direction around the center axis line O and the second support body 12 may be rotated in the other direction around the center axis line O. In addition, the first support body 11 and the second support body 12 may be rotated in the same direction around the center axis line O with a speed difference therebetween.

In addition, when the first support body 11 and the spring body 1*e* are brought into sliding contact with each other, only the second support body 12 may be rotated around the center axis line O without rotating the first support body 11 around the center axis line O.

In the second and third embodiments, at least one of the first support body 21 and the second support body 22 may be provided so as to relatively rotate around the center axis line O with respect to the other thereof. That is, when the first support body 21 and the spring bodies 1*e* are brought into sliding contact with each other, only the second support body 22 may be rotated around the center axis line O without rotating the first support body 21 around the center axis line O, and only the first support body 21 may be rotated around the center axis line O without rotating the second support body 22 around the center axis line O.

In addition, the first support body 21 and the second support body 22 may be rotated in the same direction around the center axis line O with a speed difference therebetween.

In the second to fourth embodiments, a plurality of pressing projections 13 of the first embodiment may be provided in place of disc-shaped press members 24.

Furthermore, the components in the above-described embodiments can be appropriately replaced with well-known components within a range not departing from the meaning of the present invention, and the embodiments and modified examples described above may be appropriately combined.

INDUSTRIAL APPLICABILITY

According to the present invention, it is possible to obtain a disc spring in which a compressive residual stress is applied to an outer end portion of a spring body in a radial direction such that the compressive residual stress is maximized on an inner circumferential surface where the highest tensile stress is generated at the time of using the disc spring and decreases toward an outer circumferential surface throughout the entire length in a circumferential direction.

REFERENCE SIGNS LIST

1: Disc spring
1*a*: Outer circumferential surface
1*b*: Inner circumferential surface
1*c*: Outer circumferential edge

1*d*: Inner circumferential edge
1*e*: Spring body
11, 21: First support body (support body)
13: Pressing projection
13*a*: Pressing surface
O: Center axis line

What is claimed is:

1. A method for manufacturing a disc spring including a spring body formed into an annular shape and having
an outer circumferential surface facing an outward side in a radial direction,
an inner circumferential surface facing an inward side in the radial direction,
an outer circumferential edge that is an end surface on the outward side in the radial direction, and
an inner circumferential edge that is an end surface on the inward side in the radial direction,
the method comprising
applying a compressive residual stress to at least an outer end portion in the radial direction on the inner circumferential surface by relatively rotating a support body supporting at least the outer end portion in the radial direction on the inner circumferential surface and the spring body around a center axis line of the spring body while the support body and the spring body are brought into sliding contact with each other in a state in which a compressive force in an axial direction along the center axis line is applied to the spring body using the support body,
wherein the compressive residual stress is applied to a plurality of the disc springs at the same time in a state in which the plurality of disc springs are disposed in series in the axial direction.

2. A disc spring comprising
a spring body formed into an annular shape and having
an outer circumferential surface facing an outward side in a radial direction,
an inner circumferential surface facing an inward side in the radial direction,
an outer circumferential edge that is an end surface on the outward side in the radial direction, and
an inner circumferential edge that is an end surface on the inward side in the radial direction,
wherein a compressive residual stress is applied to at least an outer end portion in the radial direction on the inner circumferential surface throughout an entire length in a circumferential direction around a center axis line of the spring body,
the compressive residual stress is maximized on the inner circumferential surface and decreases toward the outer circumferential surface, and
a surface roughness of a part of the inner circumferential surface to which the compressive residual stress is applied is smaller than a surface roughness of a part inward therefrom in the radial direction.

3. The disc spring according to claim 2,
wherein a hardness of a part of the inner circumferential surface to which the compressive residual stress is applied is higher than a hardness of a part inward therefrom in the radial direction.

4. A method for manufacturing a disc spring including a spring body formed into an annular shape and having
an outer circumferential surface facing an outward side in a radial direction,
an inner circumferential surface facing an inward side in the radial direction,
an outer circumferential edge that is an end surface on the outward side in the radial direction, and
an inner circumferential edge that is an end surface on the inward side in the radial direction,
the method comprising
applying a compressive residual stress to at least an outer end portion in the radial direction on the inner circumferential surface by relatively rotating a support body supporting at least the outer end portion in the radial direction on the inner circumferential surface and the spring body around a center axis line of the spring body while the support body and the spring body are brought into sliding contact with each other in a state in which a compressive force in an axial direction along the center axis line is applied to the spring body using the support body,
wherein the support body includes a plurality of pressing projections arranged in a circumferential direction with an interval therebetween, and
at least the outer end portion in the radial direction on the inner circumferential surface is supported by the plurality of pressing projections.

5. The disc spring manufacturing method according to claim 4, wherein when a compressive force in the axial direction is applied to the spring body using the support body, the spring body is elastically deformed in the axial direction.

6. The disc spring manufacturing method according to claim 4, wherein in an axial longitudinal sectional view passing through the center axis line, the inner circumferential surface and pressing surfaces of the pressing projections are inclined toward the same direction with respect to a horizontal surface orthogonal to the center axis line, the pressing surfaces facing the inner circumferential surface in the axial direction.

7. The disc spring manufacturing method according to claim 6, wherein a compressive force in the axial direction is applied to the spring body in a state in which gaps in the axial direction are provided between the pressing surfaces and a part of the inner circumferential surface positioned inward in the radial direction from the outer end portion in the radial direction.

8. The disc spring manufacturing method according to claim 4, wherein a pressing surface of the pressing projection facing the inner circumferential surface in the axial direction exhibits a curved shape projecting in the axial direction when viewed in the radial direction.

9. The disc spring manufacturing method according to claim 4, wherein the compressive residual stress is applied to a plurality of the disc springs at the same time in a state in which the plurality of disc springs are disposed on the same plane, orientations of the plurality of disc springs in the axial direction being the same.

* * * * *